United States Patent Office 3,336,073
Patented Aug. 15, 1967

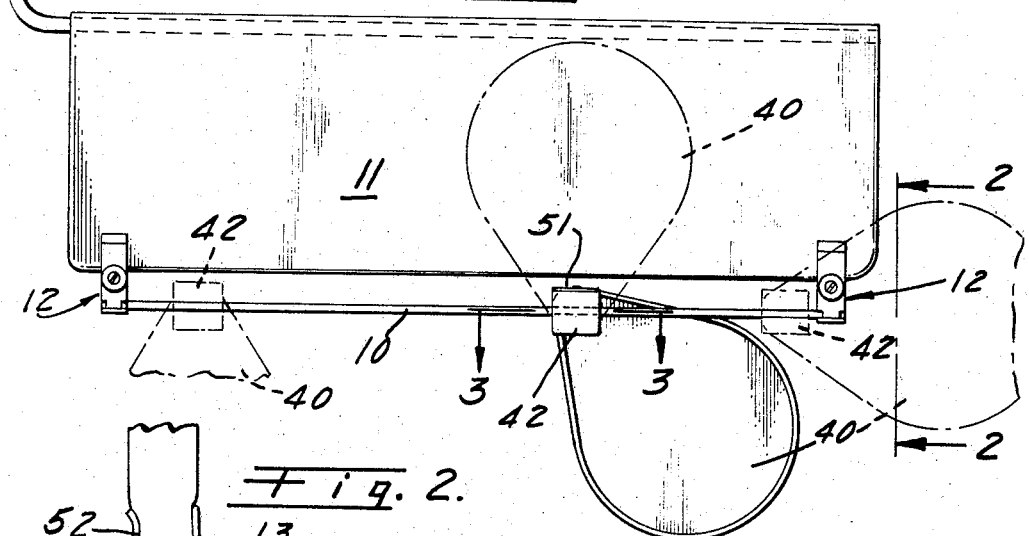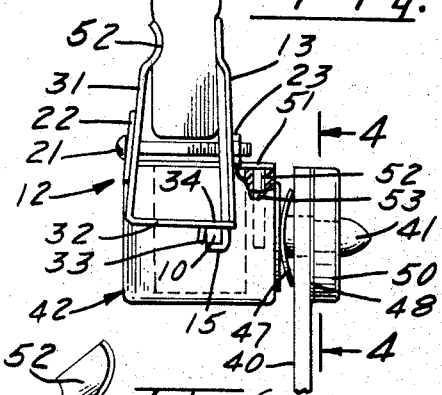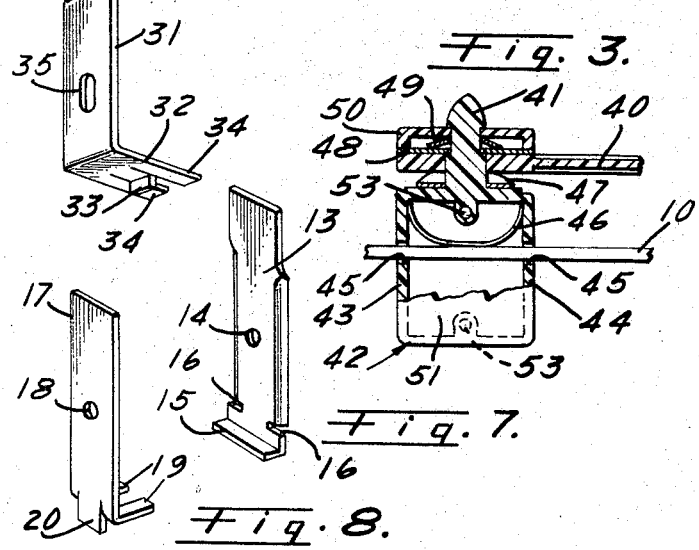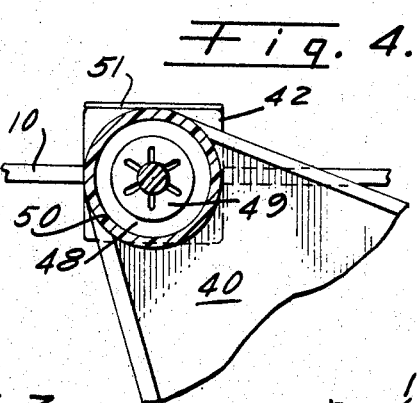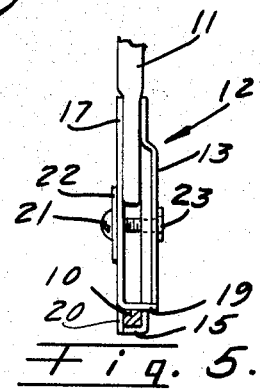

3,336,073
GLARE SHIELD FOR AUTOMOBILE VISORS
Hans Berger, 17647 Belinda St.,
Encino, Calif. 91316
Filed Aug. 16, 1965, Ser. No. 479,840
6 Claims. (Cl. 296—97)

ABSTRACT OF THE DISCLOSURE

A glare shield for automobile visors comprising an elongated square rod which is attached to the visor by a pair of clips. Each clip includes a pair of plates which are held together by a fastening member. The lower portions of the plates form a square channel which fits around the four sides of the rod. The upper portions of the plates grip the visor. A housing is slidably mounted on the rod. It encloses an arcuate leaf spring, which engages the rod to hold the housing in any position to which it is moved along the rod. A glare shield is rotatably secured to the housing, with resilient means for holding the glare shield in any position to which it is rotated.

---

This invention relates to a glare shield for automobile visors. This invention is an improvement upon my Patent No. 3,158,396 issued Nov. 24, 1964.

It is the primary object of my invention to provide a glare shield which is adapted to be quickly and easily attached to the sun visor of an automotive vehicle. My glare shield is capable of being moved to the right or left and simultaneously rotated into up and down positions, so that it may be selectively positioned in the most effective place to block the rays of the sun from the eyes of the driver or passenger.

Another object of my invention is to provide a glare shield which will automatically remain in whatever lateral or rotatable position to which it is moved.

It is a further object of my invention to provide a glare shield which is adapted to be attached to sun visors of varying thicknesses, including padded visors.

Still another object of my invention is to provide a glare shield which is simple in its structure and operation and which is capable of being manufactured and sold in large quantities at a relatively low price for widespread use.

My invention also comprises such other objects, advantages and capabilities as will later more fully appear and which are inherently possessed by my invention.

While I have shown in the accompanying drawings preferred embodiments of my invention, it should be understood that the same are susceptible of modification and change without departing from the spirit of my invention.

Referring to the drawings,

FIG. 1 is a front elevational view of my glare shield in use in a visor, with alternative positions of the shield indicated in phantom lines;

FIG. 2 is a side elevational view of the same, taken on line 2—2 of FIG. 1;

FIG. 3 is a sectional view showing the attachment of the glare shield to the rod, taken along line 3—3 of FIG. 1;

FIG. 4 is a sectional view of the glare shield attachment taken along line 4—4 of FIG. 2;

FIG. 5 is an end elevational view showing one of the attaching clips in use on a thin visor.

FIG. 6 is a pictorial view of the front plate of the clip shown in FIG. 2.

FIGS. 7 and 8 are pictorial views of the back and front plates, respectively, of the clip shown in FIG. 5.

A preferred embodiment which has been selected to illustrate my invention comprises an elongated rod 10 having a square cross section. The rod 10 is preferably substantially equal to or slightly shorter in length than the sun visor of an automobile vehicle. The rod 10 is removably attached to the visor by means of a pair of clips, which are preferably mounted adjacent the opposite ends of the rod 10. The structure of the clips may vary, depending on the thickness of the visor.

To attach the rod 10 to a relatively thin unpadded visor 11, a clip 12 is used. The clip 12 includes an elongated back plate 13 which has a central opening 14. The bottom of the back plate 13 is bent at a right angle to form a short lip 15. A pair of notches 16 are cut into the sides of the back plate 13 a short distance upwardly from the lip 15. The side edges of the back plate 13 may be bent slightly, as shown in the drawings, to provide added strength and rigidity.

A clip 12 also includes an elongated front plate 17, which has a central opening 18 aligned with the opening 14 in the back plate 13. The bottom of the front plate 17 is provided with a pair of legs 19, which extend at a right angle and which fit into the notches 16 in the back plate 13. Disposed between the legs 19 is a tab 20 which comprises an integral downward extension of the back plate 13.

In use, the back plate 13 and front plate 17 of the clip 12 are mounted on opposite sides of the visor 11, with the visor 11 disposed between the upper portions of the plates 13 and 17 above the openings 14 and 18. A fastening member such as a screw 21 extends through the openings 14 and 18. A washer 22 is disposed beneath the head of the screw 21. A nut 23 having a lock washer attached thereto is rotatably mounted on threaded end of the screw 21.

The bottom portions of the plates 13 and 17 combine to form a square channel which receives and grips the rod 10. This channel is defined by the lip 15, the legs 19, the tab 20 and the lower portion of the back plate 13 between the notches 16 and the lip 15.

As the screw 21 is tightened, the plates 13 and 17 are drawn together to tighten their grip on the visor 11. At the same time, the tab 20 is drawn toward the lower portion of the back plate 13 to tighten the grip of the plates 13 and 17 on the rod 10.

In the case of a padded visor 30, only the front plate is changed. A front plate 31 is used which is provided adjacent its upper end with an arcuate offset 52 which is adapted to grip the visor 30 inwardly from its edge. The bottom of the front plate 31 is provided with a right angular extension 32. The midportion of the end of the extension 32 is struck downwardly to form a tab 33, while the opposite sides form a pair of legs 34 which fit into the notches 16 in the back plate 13.

The operation of the clip is the same as described above, the only difference being that the plates 13 and 31 are spaced a greater distance apart to fit around a padded visor 30. The front plate 31 is preferably provided with an elongated slot 35 which is aligned with the opening 14 in the back plate 13. The slot 35 permits angular movement of the front plate 31 to accommodate visors of different thicknesses.

A glare shield 40 is preferably formed of plastic or other suitable material which is opaque or which acts to reduce glare. The shield 40 may be substantially teardrop shaped and may have a thickened portion around its edges. The narrow end of the glare shield 40 is rotatably mounted on a pin 41 which is formed integrally with and which extends outwardly from a substantially cubical housing 42.

The housing 42 may be conveniently moulded of plastic, with five closed sides and the pin 41 all comprising integral portions thereof. Two sides walls 43 and 44 of the housing 42 are provided with aligned square openings 45 which slidably receive the rod 10. A substantially semicircular leaf spring 46 is mounted in the housing 42 so that its midportion resiliently engages one side of the rod 40, while its ends fit against the opposite side walls 43 and 44 of the housing 42 adjacent the corners thereof. The spring 46 accordingly provides constant pressure against the rod 10 which resists sliding movement of the housing 42 with respect to the rod 10.

The narrow end of the shield 40 is provided with a circular opening which fits around the pin 41 adjacent to the housing 42. A circular spring washer 47 is disposed between the shield 40 and the housing 42. The spring washer 47 resiliently bears against the housing 42 and the shield 40, to provide tension which resists rotation of the shield 40 with respect to the housing 42.

A flat spacer washer 48 is disposed on the opposite side of the shield 40 from the spring washer 47. A lock washer 49 is disposed adjacent to the flat washer 48. The lock washer 49 circumferentially engages a slightly reduced portion of the pin 41. A cap 50, which is preferably formed of plastic, is snapped over the enlarged end of the pin 41 in the manner of snap beads.

The housing 42 is provided with a cover 51 having a pair of pins 52 which fit into sockets 53 formed adjacent the midportion of the front and back walls of the housing 42.

It will be seen that the glare shield 40 may be rotated to any desired position against the urging of spring washer 47. Upon its release, the shield 40 will remain in any position to which it has been rotated, due to the action of the resilient washer 47.

The glare shield 40 can accordingly be moved to any lateral position along rod 10 and can also be rotated to any desired up or down position. It will remain in whatever lateral or rotational position to which it is moved until sufficient pressure is exerted against it to overcome the resilient tension and move it to a new position.

It should be noted that my glare shield is capable of use on other vehicles and in other places, such as airplanes, boats and in the home. It may be attached to existing visors or otherwise suitably mounted for use in such applications.

I claim:

1. In a glare shield attachment for the sun visor of an automotive vehicle, an elongated rod substantially equal in length to the visor, said rod having a substantially square cross-section, a pair of attaching clips disposed adjacent to the opposite ends of said rod, each of said clips including elongated front and back plates adapted to fit on opposite sides of the visor, the bottom of said back plate having a substantially right angular lip extending toward said front plate, the sides of said back plate having a pair of notches disposed directly above said lip, said front plate having a pair of substantially right angular legs extending toward said back plate, said legs fitting within said notches, said front plate having a tab extending parallel to said back plate and spaced slightly therefrom, said legs, tab, lip and the portion of said back plate between said notches and lip forming a substantially square channel fitting around said rod, said front and back plates having aligned openings, a threaded fastening member extending through said openings, said fastening member adapted to be tightened to grip the visor between the upper portions of said plates and simultaneously grip said rod between the lower portions of said plates, and a glare shield mounted for sliding movement along said rod between said clips.

2. The structure described in claim 1, and a housing slidably mounted on said rod, a leaf spring mounted within said housing, said leaf spring having its midportion bearing against one side of said rod to provide resilient resistance to the movement of said housing along said rod, said spring normally holding said housing at any position to which it is moved along said rod, while permitting free manual sliding movement of said housing along said rod, said glare shield being rotatably mounted with respect to said housing, and resilient means normally holding said glare shield in any position to which it is rotated, while permitting free manual rotation of said glare shield with respect to said housing.

3. The structure described in claim 1, said front plate having a right angular extension, the end of said extension forming said legs and tab, said extension spacing said front plate from said back plate to accommodate a padded visor, the opening in said front plate being elongated to permit angular movement of said front plate to accommodate visors of different thicknesses.

4. In a glare shield attachment for the sun visor of an automotive vehicle, an elongated rod substantially equal in length to the visor, said rod having a substantially square cross-section, a pair of attaching clips disposed adjacent to the opposite ends of said rod, each of said clips including an elongated front plate and a separate elongated back plate, said plates being adapted to fit on opposite sides of the visor, each of said plates including a lower portion thereof defining two sides of a substantially square channel, said channel having four enclosed sides which extend parallel to and engage the sides of said rod, and a fastening member extending through said front and back plates, said fastening member adapted to be tightened to grip the visor between the upper portions of said plates and simultaneously grip said rod between the lower portions of said plates, and a glare shield mounted for sliding movement along said rod between said clips.

5. The structure described in claim 4, and a housing slidably mounted on said rod, an arcuate leaf spring mounted within said housing, said leaf spring having its midportion bearing against said rod to provide resilient resistance to the movement of said housing along said rod, said spring normally holding said housing at any position to which it is moved along said rod, while permitting free manual sliding movement of said housing along said rod, said glare shield being rotatably mounted with respect to said housing, and resilient means normally holding said glare shield in any position to which it is rotated, while permitting free manual rotation of said glare shield with respect to said housing.

6. In a glare shield attachment for the sun visor of an automotive vehicle, an elongated rod substantially equal in length to the visor, said rod having a substantially square cross-section, a pair of attaching clips disposed adjacent to the opposite ends of said rod, each of said clips including elongated front and back plates adapted to fit on opposite sides of the visor, the bottom of said back plate having a substantially right angular lip extending toward said front plate, said front plate having a pair of substantially right angular legs extending toward said back plate, said front plate having a tab extending parallel to said back plate and spaced slightly therefrom, said legs, tab, lip and the lower portion of said back plate directly above said lip forming a substantially square channel fitting around said rod, a threaded fastening member extending through said plates, said fastening member adapted to be tightened to grip the visor between the upper portions of said plates and simultaneously grip said rod between the lower portions of said plates, and a glare shield mounted for sliding movement along said rod between said clips.

References Cited

UNITED STATES PATENTS

| | | | |
|---|---|---|---|
| 1,888,703 | 11/1932 | Summerbell | 296—97 X |
| 2,520,365 | 8/1950 | Hopper | 248—295 |
| 3,071,408 | 11/1963 | Turner | 296—97 |
| 3,158,396 | 11/1964 | Berger | 296—97 |

BENJAMIN HERSH, *Primary Examiner.*

J. A. PEKAR, *Assistant Examiner.*